United States Patent [19]

Taylor et al.

[11] 4,008,190
[45] Feb. 15, 1977

[54] VULCANIZATES OF EPDM AND DIENE RUBBER BLENDS

[75] Inventors: Ray D. Taylor, Brecksville; Robert A. Krueger, Cuyahoga Falls, both of Ohio

[73] Assignee: The B. F. Goodrich Company, Akron, Ohio

[22] Filed: Nov. 29, 1974

[21] Appl. No.: 528,335

Related U.S. Application Data

[63] Continuation-in-part of Ser. No. 320,266, Jan. 2, 1973, abandoned.

[52] U.S. Cl. ................................ 260/5; 260/4 R; 260/79.5 B; 260/551 S; 260/889; 260/897 A
[51] Int. Cl.$^2$ ................ C08L 7/00; C08L 9/00; C08L 23/16
[58] Field of Search ............. 260/4, 5, 79.5 B, 793, 260/889, 551 S, 897 A

[56] References Cited

UNITED STATES PATENTS

| | | | |
|---|---|---|---|
| 2,333,468 | 11/1940 | Cooper | 260/793 |
| 3,678,135 | 7/1972 | Mastromatteo et al. | 260/889 |
| 3,681,303 | 8/1972 | D'Amico | 260/79.5 B |
| 3,706,819 | 12/1972 | Usamoto et al. | 260/889 |

OTHER PUBLICATIONS

Halasa, Def. Pub. Search Copy of Ser. No. 56,212, filed July 13, 1970, Def. Pub. No. T896,004.
Halasa, Def. Pub. Search Copy of Ser. No. 56,211, filed July 13, 1970, Def. Pub. No. T889,009.

*Primary Examiner*—John C. Bleutge
*Attorney, Agent, or Firm*—Alan A. Csontos

[57] ABSTRACT

Polymer blends of ethylene-higher α-olefin-polyene (EPDM) polymers with highly unsaturated diene rubbers are cured using sulfur and a N,N-(higher alkyl) thiocarbamylsulfenamide as a vulcanization accelerator. The vulcanizates exhibit improved tensile strength, flex-heat build-up, and oil swell properties.

14 Claims, No Drawings

VULCANIZATES OF EPDM AND DIENE RUBBER BLENDS

CROSS REFERENCE TO RELATED APPLICATION

This application is a continuation-in-part of application Ser. No. 320,266 filed on Jan. 2, 1973 now abandoned.

BACKGROUND OF THE INVENTION

Ethylene-higher-α-olefin-polyene (EPDM) polymers are known for their excellent vulcanizate properties of oxygen and ozone resistance, weatherability, and heat and chemical resistance. Unfortunately, the polymers lack building tack, oil resistance, hot tear resistance, and high internal strength. These disadvantages prohibit the use of EPDM polymers in applications such as tires and automotive and industrial hosing, which have been dominated by high unsaturation diene rubbers such as natural rubber, styrene-butadiene rubbers, and polychloroprene. However, the diene rubbers have disadvantages in their lack of oxygen and ozone resistance and poor heat resistance and weatherability. A practical solution to the problems would be to physically blend the two types of polymers, cure the blend, and obtain a vulcanizate having the desirable properties of each type of polymer. One serious problem is cure incompatibility, or simply the inability of a cure system to sufficiently cure each type of polymer in the polymer blend, and to sufficiently co-vulcanize the types of polymers in the blend. Cure incompatibility is demonstrated by the failure of the vulcanizate to perform at a level predicted from a consideration of the ratios of the polymers in the blend. Often the performance will be much less than predicted, and even worse than the performance of either polymer alone. Poor co-vulcanization is readily apparent in the stress-strain (tensile, elongation) properties, flex-heat build up, and oil swell properties.

A major factor in cure incompatibility is the preference vulcanization accelerators show for one polymer over another, leading to over-cure of one polymer and undercure of the other polymer. To alleviate this preference, vulcanization accelerators having long chain hydrocarbon radicals (higher alkyl radicals) have been prepared and employed in polymer blends. U.S. Pat. No. 3,706,819 describes higher alkyl substituted thiuram disulfide and benzothiazyl sulfenamide accelerators, and U.S. Pat. No. 3,678,135 discloses higher alkyl dithiocarbamate accelerators. These accelerators, although they effectively co-cure the polymers in a blend, have other disadvantages in that they are either too scorchy for many uses or they provide too long of cure times. Higher alkyl thiocarbamylsulfenamides have been found to provide effective co-cure of the polymers in a blend, and also provide an improved balance between scorch safety and fast cure. This discovery is the subject of a related application for patent, Ser. No. 320,266 filed on Jan. 2, 1973. It has now been discovered that the positioning of the higher alkyl groups on the thiocarbamylsulfenamide compound significantly affects the compounds ability to co-vulcanize polymer blends of ethylene-higher α-olefin-polyene polymers and high unsaturation rubbers.

SUMMARY OF THE INVENTION

Compositions comprising an ethylene-higher α-olefin-polyene (EPDM) polymer, a highly unsaturated diene rubber, and a N,N-(higher alkyl) thiocarbamylsulfenamide of the formula

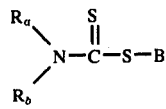

where B is selected from the group consisting of

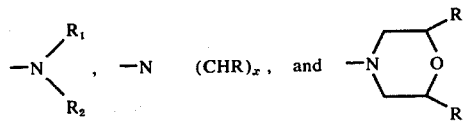

wherein $R_1$ is hydrogen or the same as $R_2$, and $R_2$ is selected from the group consisting of alkyl radicals containing 1 to about 4 carbon atoms, a cycloalkyl radical containing 4 to 7 carbon atoms in the ring, a phenyl radical, and an aralkyl radical or alkaryl radical containing 7 to about 12 carbon atoms; R is hydrogen or an alkyl radical containing 1 to 2 carbon atoms; $x$ is 4 to 7; and $R_a$ and $R_b$ are alkyl radicals containing 6 to about 30 carbon atoms, are cured using sulfur or a sulfur-donor to yield vulcanizates having improved tensile, flex-heat build up, and oil swell properties.

DETAILED DESCRIPTION

The ethylene-higher α-olefin-polyene (EPDM) polymers empolyed have an ethylene content of from about 10% to about 90% by weight, a higher α-olefin content of about 10% to about 80% by weight, and a polyene content of about 0.5% to about 20% by weight, all weights based on the total weight of the polymer. The higher α-olefin contains 3 to about 14 carbon atoms. Examples of these are propylene, isobutylene, 1-butene, 1-pentene, 1-octene, 2-ethyl-1-hexene, 1-dodecene, and the like. The polyene can be a conjugated diene such as isoprene, butadiene, chloroprene, and the like; a nonconjugated diene; a triene, or a higher enumerated polyene. Examples of trienes are 1,4,9-decatriene, 5,8-dimethyl-1,4,9-decatriene, 4,9-dimethyl-1,4,9-decatriene, and the like. The nonconjugated dienes are more preferred. The nonconjugated dienes contain from 5 to about 25 carbon atoms. Examples are nonconjugated diolefins such as 1,4-pentadiene, 1,4-hexadiene, 1,5-hexadiene, 2,5-dimethyl-1,5-hexadiene, 1,4-octadiene, and the like; cyclic dienes such as cyclopentadiene, cyclohexadiene, cyclooctadiene, dicyclopentadiene, and the like; vinyl cyclic enes such as 1-vinyl-1-cyclopentene, 1-vinyl-1-cyclohexene, and the like; alkylbicyclonondienes such as 3-methylbicyclo(4,2,1)nona-3,7-diene, 3-ethylbicyclonondiene, and the like; indenes such as methyl tetrahydroindene and the like; alkenyl norbornenes such as 5-ethylidene-2-norbornene, 5-butylidene-2-norbornene, 2-methallyl-5-norbornene, 2-isopropenyl-5-norbornene, 5-(1,5-hexadienyl)-2-norbornene, 5-(3,7-octadieneyl)-2-norbornene, and the like; and tricyclo dienes such as 3-methyl-tricyclo-(5,2,1,0$^{2,6}$)-3,8-decadiene and the like.

Preferredly, the EPDM polymers contain from about 20% to about 80% by weight of ethylene, about 19% to about 70% by weight of a higher α-olefin, and about 1% to about 10% by weight of a nonconjugated diene. The more preferred higher α-olefins are propylene and 1-butene.

More preferredly, the EPDM polymers have an ethylene content of from about 50% to about 70% by weight, a propylene content of from about 20% to about 49% by weight, and a nonconjugated diene content from about 1% to about 10% by weight, all weights based upon the total weight of the polymer.

The EPDM polymers have molecular weights from about 20,000 to about 2,000,000 more. Their physical form varies from waxy materials to rubbers to hard plastic-like polymers. The have dilute solution viscosities (DSV) from about 0.5 to about 10, measured at 30° C. on a solution of 0.1 gram of polymer in 100 cc. of toluene.

The highly unsaturated diene rubbers have an olefinic (>C×C<) content from about 20% to about 45% by weight based upon the total weight of the polymer. The rubbers usually contain at least 50% and up to 100% by weight of a conjugated diene monomer containing 4 to about 8 carbon atoms, and up to about 50% by weight of copolymerizable vinylidene monomers having a terminal vinylidene (CH$_2$=C<) group. Examples of the conjugated diene monomers are butadiene, isoprene, chloroprene, 2-isopropyl-1,3-butadiene, 1,3-pentadiene, and the like. More preferred are the conjugated dienes containing 4 to about 6 carbon atoms such as butadiene, chloroprene, and isoprene.

Examples of copolymerizable vinylidene monomers containing a terminal vinylidene group are (a) mono-olefins containing 2 to about 8 carbon atoms; (b) vinyl aromatics such as styrene, α-methyl styrene, vinyl toluene, chlorostyrene, and the like; (c) vinyl nitriles such as acrylonitrile, methacrylonitrile, and the like; (d) vinyl and allyl esters such as vinyl acetate, vinyl propionate, allyl acetate, and the like; (e) vinyl and allyl ethers such as vinyl methyl ether, allyl methyl ether, and the like; (f) divinyls and diacrylates such as divinylbenzene, divinyl ether, diethylene glycol diacrylate, and the like; and (g) acrylates of the formula

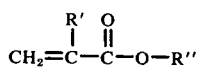

wherein R' is -H, -CH$_3$, or -C$_2$H$_5$, and R'' is an alkyl radical containing 1 to 18 carbon atoms or an alkoxyalkyl, an alkylthioalkyl, or cyanoalkyl radical containing 2 to about 12 carbon atoms, Examples of such acrylates are ethyl acrylate, butyl acrylate, octadecyl acrylate, methoxyethyl acrylate, butoxyethyl acrylate, hexylthioethyl acrylate, α-cyanoethyl acrylate, cyanooctyl acrylate, methyl methacrylate, octyl methacrylate, ethyl ethacrylate, and the like.

The diene rubbers include natural rubber, the general purpose synthetic rubbers, and specialty rubbers. Examples of these rubbers are natural rubber, polyisoprenes, polybutadienes, poly(butadiene-styrene) rubbers, poly(isoprene-styrene) rubbers, polychloroprenes, poly(butadiene-acrylonitrile) rubbers, poly(isoprene-acrylonitrile) rubbers, polypentenamer rubbers and the like. The rubbers have molecular weights and DSV values similar to those of the EPDM polymers.

The EPDM polymer and diene rubber can be blended together in any ratio of one polymer to the other. The weight percent of EPDM polymer in the blend can be from about 1% to about 99%. More often, the weight percent of EPDM will be from about 10% to about 95% by weight of the blend. The greatest improvement in vulcanizate properties is demonstrated in blends containing from about 25% to about 90% by weight of EPDM polymer based upon the weight of the blend.

More than one EPDM polymer can be employed in the blend. Similarly, more than one diene rubber can be employed. Therefore, though many blends will contain only two polymers, over two and up to 4 or more polymers can be present in a blend. In such a case, the EPDM polymers are treated as a group, and the diene rubbers treated as a group for purposes of determining the weight percents of the polymers in the blend. For example, a blend containing 30% by weight of a polymer of ethylene-propylene-dicyclopentadiene, 50% by weight of polyisoprene, and 20% by weight of poly(butadiene-styrene) would contain 30% by weight of EPDM and 70% by weight of diene rubber for the purposes of this invention.

The polymer blend is cured using sulfur or a sulfur-donor and a thiocarbamylsulfenamide as a vulcanization accelerator. The sulfur or sulfur-donor is used in a range from about 0.5 to about 10 parts by weight based upon 100 parts by weight of the polymer blend. More preferredly, the range is from about 1 part to about 5 parts by weight. Examples of sulfur-donors are tetramethylthiuram disulfide, tetraethylthiuram disulfide, dipentamethylenethiuram hexasulfide, and the like.

The thiocarbamylsulfenamides are used in the range of from about 0.1 part to 10 parts by weight per 100 parts by weight of the polymer blend, and more preferably in from about 0.5 to about 5 parts by weight. The compounds have the formula

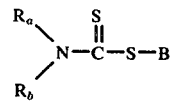

where B is selected from the group consisting of

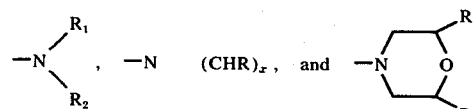

wherein R$_1$ is hydrogen or the same as R$_2$, and R$_2$ is selected from the group consisting of alkyl radicals containing 1 to about 4 carbon atoms, a cycloalkyl radical containing 4 to 7 carbon atoms in the ring, a phenyl radical, and an aralkyl or alkaryl radical containing 7 to about 12 carbon atoms; R is hydrogen or an alkyl radical conaining 1 to 2 carbon atoms, and $x$ is 4 to 7; and where R$_a$ and R$_b$ are alkyl radicals containing 6 to about 30 carbon atoms. The alkyl radicals can be linear or branched and can contain primary, secondary and/or tertiary carbon atom configurations. The cycloalkyl radicals can be further substituted with alkyl radicals containing 1 to 4 carbon atoms. The thiocarbamylsulfenamide compounds contain at least 12 carbon atoms in the total of groups R$_a$ and R$_b$, and up to 60 carbon atoms. Examples of these compounds are: N,N-dihexylthiocarbamyl-N',N'-dimethylsulfenamide, N,N- dioctylthiocarbamyl-N',N'-diethylsulfenamide, N,N-didodecylthiocarbamyl-N'-n-butylsulfenamide, N,N-dioctadecylthiocarbamyl-N',N'-dimethylsulfenamide, N-octyl-N-dodecylthiocarbamyl-N',N'-diethylsulfenamide, N,N-di(2-ethylhexyl)thiocarbamyl-N'-ethylsulfenamide, N,N-dioctylthiocarbamyl-N',N'-dicyclobutylsulfenamide, N,N-dihexylthiocarbamyl-N',N'-dicyclohexylsulfenamide, N,N-didodecylthiocarbamyl-N',N'-diphenylsulfenamide, N,N-didoecylthiocarbamyl-N',N'-dibenzylsulfenamide, N,N-didodecylthiocarbamyl-N',N'-di-(2,6-diethylphenyl)sulfenamide, N,N-dioctylthiocarbamyl-N'-tetramethylenesulfenamide, N,N-didodecylthiocarbamyl-N'-hexamethylenesulfenamide, N,N-didodecylthiocarbamyl-N'-tetramethylenesulfenamide, N-dodecyl-N-octadecylthiocarbamyl-N'-pentamethylenesulfenamide, N,N-dioctylthiocarbamyl-N'-oxydiethylenesulfenamide, and N,N-didodecylthiocarbamyl-N'-(2,6-dimethyl)oxydiethylenesulfenamide. Preferredly, $R_a$ and $R_b$ are alkyl radicals containing 8 to about 24 carbon atoms wherein the total carbons in $R_a$ and $R_b$ is from 16 to about 48 carbon atoms. Examples of the preferred compounds are: N,N-di-(2-ethylhexyl)thiocarbamyl-N',N'-dimethylsulfenamide, N,N-dioctylthiocarbamyl-N'-butylsulfenamide, N,N-didecylthiocarbamyl-N'-phenylsulfenamide, N,N-didodecylthiocarbamyl-N'-methyl-N'-ethylsulfenamide, N,N-ditetradecylthiocarbamyl-N',N'-diphenylsulfenamide, N,N-dioctadecylthiocarbamyl-N',N'-dibutylsulfenamide, N,N-dieicosylthiocarbamyl-N',N'-dibenzylsulfenamide, N-octyl-N-dodecylthiocarbamyl-N',N'-dimethylsulfenamide, N,N-didecylthiocarbamyl-N',N'-dicyclohexylsulfenamide, N,N-ditetradecylthiocarbamyl-N',N'-dicyclohexylsulfenamide, N,N-dioctadecylthiocarbamyl-N',N'-dicyclohexylsulfenamide, N,N-ditetradecylthiocarbamyl-N',N'dicyclooctylsulfenamide, N,N-ditetradecylthiocarbamyl-N',N'-di-(2,6-dimethylcyclohexyl)sulfenamide, N,N-dioctylthiocarbamyl-N'-pentamethylenesulfenamide, and N-octyl-N-decylthiocarbamyl-N'-oxydiethylenesulfenamide.

More preferredly, B is -NR$_1$'R$_2$' where R$_1$' and R$_2$' are alkyl radicals containing 1 to 4 carbon atoms, or are cycloalkyl radicals containing 5 to 7 carbon atoms in the ring. Examples of the more preferred compounds are: N,N-di(2-ethylhexyl)thiocarbamyl-N',N'-diethylsulfenamide, N,N-didecylthiocarbamyl-N',N'-dimethylsulfenamide, N,N-didodecylthiocarbamyl-N'-isobutylsulfenamide, N,N-ditridecylthiocarbamyl-N',N'-diisopropylsulfenamide, N,N-dioctadecylthiocarbamyl-N'-t-butylsulfenamide, N,N-dieicosylthiocarbamyl-N',N'-diethylsulfenamide, N-octyl-N-dodecylthiocarbamyl-N',N'-diisopropylsulfenamide, N-decyl-N-octadecylthiocarbamyl-N',N'-dicyclohexylsulfenamide, N,N-didecylthiocarbamyl-N'-isopropyl-N'-methylsulfenamide, N,N-didodecylthiocarbamyl-N',-N'-dicyclopentylsulfenamide, N,N-di(2-ethylhexyl)thiocarbamyl-N',N'-dicyclohexylsulfenamide, N,N-dioctylthiocarbamyl-N',N'-dicyclopentylsulfenamide, N-octyl-N-decylthiocarbamyl-N',N'-dicyclohexylsulfenamide, N,N-didodecylthiocarbamyl-N',N'-dicycloheptyl sulfenamide, N,N-dioctadecylthiocarbamyl-N',N'-dicyclohexylsulfenamide, and N,N-dieicosylthiocarbamyl-N',N'-dicyclohexylsulfenamide.

Most preferredly, $R_a$ and $R_b$ are alkyl radicals containing 8 to about 24 carbon atoms and $R_a$ and $R_b$ are the same, i.e., the amine is symmetrical; and B is -NR$_1$'R$_2$' where R$_1$' and R$_2$' are cycloalkyl radicals containing 5 to 7 carbon atoms in the ring. Examples of the most preferred compounds are: N,N-di(2-ethylhexyl)thiocarbamyl-N',N'-dicyclohexylsulfenamide, N,N-ditetradecylthiocarbamyl-N',N'-dicycloheptylsulfenamide, N,N-dioctadecylthiocarbamyl-N',N'-dicyclohexylsulfenamide, N,N-dieicosylthiocarbamyl-N',N'-dicyclohexylsulfenamide.

The thiocarbamylsulfenamides are prepared in a process comprising the reaction of an amine and a monohaloamine with carbon disulfide. The monochloroamines are readily prepared by reacting an appropriate primary or secondary amine with a chlorinating agent such as sodium hypochlorite, NaOCl.

The EPDM polymer, the diene rubber, the sulfur and the thiocarbamylsulfenamide compound are admixed using standard mixing techniques and procedures. The mixing equipment used can be Banburys, Henschel mixers, extruders, two-roll mills and like equipment. The ingredients are mixed at a temperature and for a time to obtain uniform mixing. Vulcanization temperatures and time employed are typical; temperatures ranging from about 250° F. to about 400° F., and times ranging from about 10 minutes to about 60 minutes.

Many other compounding ingredients may be used along with the sulfur or sulfur-donor and the thiocarbamylsulfenamide compound. Such ingredients include activators such as zinc, calcium, and magnesium oxide, lead monoxide and dioxide, fatty acids such as stearic and lauric acid, and salts thereof such as cadmium, zinc and copper stearate and lead oleate; fillers such as channel blacks, reinforcing blacks, and thermal blacks, calcium and magnesium carbonate, clacium and barium sulfates, aluminum silicates, phenol-formaldehyde and polystyrene resins, asbestos, and the like; plasticizers and extenders such as dialkyl organic acids like diisobutyl, diisooctyl, diisodecyl, and dibenzyl oleates, stearates, sebacates, azelates, phthalates, and the like, ASTM type 2 petroleum oils, ASTM D226 aromatic, naphthalenic and paraffinic oils, castor oil, tall oil, glycerin, and the like; antioxidants, antiozonants, and stabilizers such as N,N'-di-β-napthyl-p-phenylenediamine, N-phenyl-β-naphthylamine, N,N'-dioctyl-p-phenylenediamine, N-1,3-dimethylbutyl-N'-phenyl-p-phenylenediamine, 4-isopropylaminodiphenylamine, 2,6-di-t-butyl paracresol, 2,2'-methylenebis-(4-ethyl-6-t-butyl phenol), 2,2'-thiobis-(4-methyl-6-t-butyl phenol), bisphenol-2,2'-methylenebis-6-t-butyl-4-ethylphenol, 4,4'-butylidenebis-(6-t-butyl-m-cresol), 2-(4-hydroxy-3,5-t-butylaniline)-4,6-bis(octylthio)-1,3,5-triazine, hexahydro-1,3,5-tris-β-(3,5-di-t-butyl-4-hydroxyphenyl)propionyl-s-triazine, tris-(3,5-di-t-butyl-4-hydroxybenzyl)isocyanurate, tetrakismethylene-3(3',5'-di-t-butyl-4'-hydroxyphenyl)propionate methane, distearyl thiodipropionate, dilauryl thiodipropionate, tri(nonylatedphenyl)phosphite, and the like; and other ingredients such as pigments, tackifiers, flame retardants, fungicides, and the like.

Although the disclosure is directed to blends of EPDM polymers with diene rubbers, the disclosed N,N-(higher alkyl) thiocarbamylsulfenamides can be effectively used in blends of diene rubbers with other low unsaturation polymers containing from about 0.5% to about 20% by weight of interpolymerized polyene monomer. Examples of such polymers are olefin elastomers such as butyl rubbers prepared by the interpolymerization of isobutylene and isoprene; polymers prepared by the interpolymerization of the aforementioned conjugated and nonconjugated diene monomers with lower (1-8 carbon) alkyl acrylate monomers; and polymer prepared by the interpolymerization of the diene monomers with vinyl ketones, vinyl esters, or vinyl ethers. The weight percent range of these low unsaturation polymers employed with the high unsaturation diene rubbers is similar to that of the EPDM polymer. The level of sulfur and thiocarbamylsulfenamide accelerator employed in the polymer blend are also similar.

The composition of (1) an EPDM polymer, (2) a highly unsaturated diene rubber, (3) sulfur or a sulfur-donor, and (4) the defined N,N-(higher alkyl) thiocarbamylsulfenamide, cures readily to yield vulcanizates having improved tensile strength, elongation, flex-crack resistance, heat resistance, and oil resistance (if blended with an oil resistant diene) over that of polymer blends cured using commonly known accelerators. It was discovered that the use of higher alkyl thiocarbamylsulfenamides in polymer blends yields an improved balance of scorch safety and fast cure over that obtained using higher alkyl benzothiazolesulfenamides and dithiocarbamates as disclosed in U.S. Pat. Nos. 3,678,135 and 3,706,819. It was unexpectedly found that the positioning of the higher alkyl groups on the thiocarbamylsulfenamide compound substantially affected its ability to co-vulcanize the polymers in the blend.

The composition vulcanizates are useful in applications requiring resistance to heat, oxygen, ozone, chemicals, oil, and flex-cracking. The vulcanizates are of particular use in automotive applications such as tires, hosing, belting, gaskets, seals, weatherstripping, and windshield wiper blades.

The vulcanizates were evaluated as to tensile and elongation following ASTM D412, hardness following ASTM D676 durometer A, oil swell at 70 hours, at 100° C., following ASTM D471, and flex heat build up following the procedure ASTM D623 (B.F.G. Flexometer at a 143 psig load at 50° c. and 17.5%). The flexometer test employs a 0.5 inch diamter, 1.0 inch height cylinder of the vulcanized diameter, blend. The cylinder is subjected to cyclic compressions of a given percent, at a given load and a given temperature. After time has elapsed, the temperature of the cylinder is recorded. The results are given as temperature use, or ΔT.

The following examples serve to more fully illustrate the invention. Ingredients are given in parts by weight unless otherwise specified. The thiocarbamylsulfenamide compounds are used on an equal mole basis in the examples.

The following mixing procedure was generally used for blending the polymers. Each polymer in the blend was separately and independently mixed with compounding ingredients (carbon black, zinc oxide, stearic acid, and the like) except for the cure system; i.e., sulfur and accelerator(s). The mixes were prepared in a Banbury mixer using a standard mixing technique. Portions of each mix were then banded upon a two-roll mill to form a polymer blend. Sulfur and accelerator(s) were added to the polymer blend while on the mill. Total Banbury mixing time was about 5 minutes, and total mill mixing time was about 7 minutes.

EXAMPLES

Thiocarbamylsulfenamide compounds were prepared using either an iodine oxidation process as disclosed in an article by Smith et al in *Journal of Organic Chemistry*, Vol. 14 (1949) page 935 et seq., or, preferredly, by a unique process whereby an amine and a monohaloamine is reacted with carbon disulfide in the presence of a base. The latter process is particularly adapted to the preparation of the N,N-(higher alkyl)-thiocarbamyl-N',N'-(cycloalkyl)sulfenamides of the invention as the dicycloalkylamine is directed toward the sulfur-atom nitrogen positions.

EXAMPLE I

N,N,N',N'-tetramethylthiocarbamylsulfenamide was prepared by reacting about 0.22 mole of dimethylamine and about 0.22 mole of dimethylchloroamine with 0.2 mole of carbon disulfide in the presence of about 0.32 mole of sodium hydroxide and in a mixture of carbon tetrachloride and water.

The chloroamine was prepared in situ prior to use. 150 milliliters of carbon tetrachloride, $CCl_4$, was added to a reactor vessel equipped for agitation. 79.2 grams of a solution of dimethylamine at 25% by weight in water (0.44 mole) was added and the mixture cooled to 10° C. Then 100 milliliters of a solution of NaOCl at 14% by weight in water (0.22 mole) was added, and the mixture agitated for 15 minutes while maintaining the temperature at 10° C. The reaction mixture contained about 0.22 mole each of dimethylamine and dimethylchloroamine and about 0.22 mole of NaOH by-product. To the reaction mix, 4.0 grams (0.1 mole) of solid NaOH was added, followed by 15.2 grams (0.2 mole) of carbon disulfide. The mixture was agitated for 15 minutes while keeping the temperature at 6° to 12° C. The final pH of the aqueous phase was about 10.

The mixture was allowed to settle and the nonaqueous phase separated out and filtered to remove some disulfide by-product. The $CCl_4$ ws then evaporated off by heating under reduced pressure. A white crystalline solid having a melting point of 49° C. was obtained in the amount of 23.7 grams. This reflects a yield of 72% by weight based on theoretical. The N,N,N',N'-tetramethylthiocarbamylsulfenamide was identified through its infrared (IR) spectrum.

EXAMPLE II

N-oxydiethylene-N',N'-dicyclohexylthiocarbamylsulfenamide was prepared following the procedure of Example I. 100 milliliters of chloroform, 17.4 grams (0.2 mole) of morpholine, and 36.2 grams (0.2 mole) of dicyclohexylamine were placed in a reactor vessel, cooled to 0° C., and then 110 grams of a solution of NaOCl at 13% by weight in water (0.2 mole) was added. The mixture was stirred for 10 minutes and 15.2 grams (0.2 mole) of carbon disulfide added. An additional 100 milliliters of chloroform was added. After 20 more minutes of stirring while maintaining the temperature at 30° – 35° C., the mixture was allowed to settle. The nonaqueous phase was separated and the chloroform evaporated off. A light yellow solid was obtained which was slurried in 100 milliliters of methanol, cooled to −10° C., filtered, and the filtrate washed with an additional 25 milliliters of MeOH to yield 51.1 grams of a white crystalline solid. Water was added to the methanol solution which yielded an additional 1.5 grams of the crystals. Total weight was 52.6 grams, reflecting a yield of 77% based on theoretical. The IR spectrum and carbon/hydrogen/nitrogen element weight analysis of the compound was consistent with N-oxydiethylene-N',N'-dicyclohexylthiocarbamylsulfenamide. Calculated weight percents for the formula $C_{17}H_{30}N_2S_2O$ were 59.6% C, 8.2% N, and 8.8% H. Test values were 59.5% C, 8.1% N, and 9.1% H.

N,N-dimethyl-N',N'-dicyclohexylthiocarbamylsulfenamide was prepared. 100 milliliters of carbon tetrachloride, 39.6 grams of a solution of dimethylamine at 25% by weight in water (0.22 mole), and 36.2 grams (0.2 mole) of dicyclohexylamine were placed in a reactor vessel and the mixture cooled to 10° C. 114 milliliters of a solution of NaOCl at 14% by weight in water (0.23 mole) was added and the mixture stirred for 15 minutes at 10°–15° C. 200 milliliters of water containing 25 grams of $NaHCO_3$ and 11 grams $Na_2CO_3$ was then added as a buffer solution. The mixture was warmed to 20° C. and 15.2 grams (0.2 mole) of carbon disulfide was addd with stirring. The mixture was stirred for 40 minutes while keeping the temperature at 32°–35° C. The mixture was allowed to settle and the nonaqueous phase was separated out and filtered. The $CCl_4$ was evaporated off leaving 61 grams of a thick liquid. 150 milliliters of methanol were added and the liquid first dissolved then a solid precipitated out. The methanol slurry was cooled to −10° C. and filtered. The solids removed were dried and 44.1 grams of a white crystal obtained which had a melting point of 80°–82° C. This reflects a yield of 77% of theoretical. The N,N-dimethyl-N',N'-dicyclohexylthiocarbamylsulfenamide was identified through its IR spectrum.

EXAMPLE III

N,N-dieicosylthiocarbamyl-N',N'-dicyclohexylsulfenamide was prepared. 800 milliliters of chloroform and 250 grams, about 0.44 mole, of Kenamine S-190 (containing 10% by weight of dioctadecyl and 90% by weight of principally dieicosyl and a small portion of didocosylamine) were added to a reactor vessel and stirred, followed by 79.7 grams (0.44 mole) of dicyclohexylamine. Then 255.3 grams of a 14% by weight solution of sodium hypochlorite in water (0.44 mole) was added and the mixture stirred for 135 minutes at about 30° C. 33.5 grams (0.44 mole) of carbon disulfide was then added, in increments, over 1 hour's time. The mix was stirred for 150 minutes at 32°–35° C. The aqueous phase had a pH of about 10, and a negative starchiodine test was obtained. The mixture settled and the nonaqueous phase was separated out and filtered. The chloroform was evaporated off leaving a thick liquid. 2 liters of absolute ethanol were added to the liquid which first dissolved the liquid then a solid precipitated out. The solids were removed and dried. 340.4 grams of product were obtained, reflecting a yield of 94% of theoretical based on the amount of carbon disulfide used. The structure of the compound was confirmed via infrared spectra analysis and NMR spectra analysis.

Following the general procedure as given herein, other N,N-(higher alkyl)thiocarbamylsulfenamides were prepared: N,N-dihexylthiocarbamyl-N',N'-dicyclohexylsulfenamide, N,N-di(2-ethylhexyl)thiocarbamyl-N',N'-dicyclohexylsulfenamide, and N,N-dioctadecylthiocarbamyl-N',N'-dicyclohexylsulfenamide. Identity of the compounds was confirmed by IR and NMR spectra analysis.

EXAMPLE IV

Following the procedures given in the previous examples, N,N-dimethylthiocarbamyl-N',N'-didecylsulfenamide was prepared. Methylene chloride was used as the organic solvent in the process. The compound was identified via its IR and NMR spectra.

The prepared N,N-diemthyl compound is not within the scope of this invention as the N,N-alkyl radicals do not contain at least 6 carbon atoms in each radical. The N,N-didecylthiocarbamyl-N',N'-dimethylsulfenamide compound, which is within the scope of the invention, was also prepared. The process used in an iodine oxidation process as disclosed in the Smith et al article mentioned above. Sodium didecyl dithiocarbamate was prepared via the reaction of 0.1 mole didecylamine with 0.1 mole carbon disulfide in the presence of 0.1 mole of NaOH in a 50/50 water/ethanol solution. The dithiocarbamate salt solution (about 0.1 mole) was admixed with a solution of 0.4 mole of dimethylamine in water (25% by weight in water), followed by the addition of an iodide solution comprised of 100 ml. of water, 25.4 grams of iodine and 25 grams of potassium iodide. The solution was stirred at ambient temperature. 100 milliliters of methylene chloride was added to the solution which caused a phase separation to occur. The organic phase was separated off, washed with water and dried down to yield a solid product The product was washed with methanol and again dried. The identity of the desired compound was confirmed via its IR and NMR spectra.

EXAMPLE V

The thiocarbamylsulfenamides prepared in the previous examples were evaluated as vulcanization accelerators in blends of ethylene-higher α-olefin-polyene polymers with high unsaturation rubbers. Comparisons were run to demonstrate (1) that the higher alkyl thiocarbamylsulfenamides offer an improved balance of scorch safety and fast cure compared to other known higher alkyl accelerator compounds and (2) that the positioning of the higher alkyl radicals on the N,N-positions of the compound contributes significantly to their ability to co-vulcanize the polymer blends.

A series of polymer blend compositions was prepared to demonstrate the difference among three types of high alkyl substituted vulcanization accelerators in their ability to accelerate the cure of sulfur-vulcanizable polymer blends. The polymer blend compositions were prepared according to the following recipe:

|  | 1 | 2 | 3 |
|---|---|---|---|
| EPDM[a] | 60 | 60 | 60 |
| Natural Rubber[b] | 40 | 40 | 40 |
| N330 Black | 50 | 50 | 50 |
| Zinc Oxide | 5 | 5 | 5 |
| Stearic Acid | 3 | 3 | 3 |
| Sulfur | 2 | 2 | 2 |
| N,N-di(octadecyl)thiocarbamyl-N',N'-di(cyclohexyl)sulfenamide | 3.88 | — | — |
| N,N-di(octadecyl)-2-benzothiazolesulfenamide | — | 3.43 | — |
| Zinc di(dioctadecyldithio- | — | — | 3.15 |

-continued

|  | 1 | 2 | 3 |
|---|---|---|---|
| carbamate) | | | |

[a] 60% by weight ethylene, 36% by weight propylene, 4% by weight ethylidene norbornene and having a 50 Mooney viscosity (ML-10 at 212° F.).
[b] Rib smoked sheet No. 1.

The comparison among types of high alkyl substituted accelerators is based on an equal mole level of the

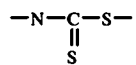

grouping. Sample 1 is a composition of the present invention; Sample 2 is an art composition within the disclosure of U.S. Pat. No. 3,706,819; and Sample 3 is an art composition with the disclosure of U.S. Pat. No. 3,678,135. The three samples were evaluated as to their scorch safety and cure rate using a Mooney Viscometer and a Monsanto Cone Curometer, and then were cured and their vulcanizate properties of tensile and elongation measured. The results of the testing are as follows:

|  | 1 | 2 | 3 |
|---|---|---|---|
| Mooney Scorch at 266° F. | | | |
| Minimum Viscosity | 35 | 33 | Scorched during Mixing |
| Scorch Time[a], minutes | 8 | 16 | |
| TΔ30[b], minutes | 10 | 21 | |
| Monsanto Cone Curometer at 302° F. | | | |
| Minimum Torque | 12 | 11 | 19 |
| Scorch Time[c], minutes | 1.0 | 1.6 | 0.4 |
| Cure Time[d], minutes | 4.1 | 5.3 | 3.6 |
| Cured at 302° F. | | | |
| Time of Cure, minutes | 11 | 13 | 10 |
| Tensile Strength, psig | 1730 | 1630 | 1860 |
| Elongation, percent | 490 | 460 | 480 |

[a] Time to rise 5 units over minimum viscosity
[b] Time to rise 35 units over minimum viscosity
[c] Time to rise 2 torque units over minimum torque
[d] Time to reach 90% of difference between maximum and minimum torque Although all three types of high alkyl substituted accelerators cure the polymer blend, Sample 3, the art composition containing the dithiocarbamate type accelerator, was extremely scorchy (it had a very short scorch time which rendered the sample actually immeasurable in the Mooney Scorch test); Sample 2, the art composition containing the benzothiazyl type accelerator, had scorch safety but a long cure time; and Sample 1, the composition of the present invention, exhibited as good balance between scorch safety and fast cure time.

EXAMPLE VI

Polymer blends were prepared containing EPDM and SBR rubber. The EPDM polymer used had a composition of 60% by weight ethylene, 36% by weight propylene, and 4% by weight ethylidene norbornene, and had a Mooney value (ML-10 at 212° C.) of about 50. The SBR rubber used was SBR 1502, having 76.5% by weight of butadiene and 23.5% by weight of styrene, and a raw polymer Mooney of about 50. The rubbers were blended at a ratio of 2 parts EPDM to 1 part of SBR and cured using a N,N-(higher alkyl) thiocarbamylsulfenamide of this invention as the accelerator. A control sample was prepared and cured using a well known commercial accelerator. The recipes used and data obtained are as follows:

|  | 1 | 2 | 3 |
|---|---|---|---|
| EPDM | 100 | 67 | 67 |
| SBR | — | 33 | 33 |
| N330 Black | 50 | 50 | 50 |
| Zinc Oxide | 5 | 5 | 5 |
| Stearic Acid | 3 | 3 | 3 |
| Sulfur | 2.0 | 1.75 | 1.50 |
| C$_{52}$[1], parts | 4 | 4 | — |
| moles | 0.0049 | 0.0049 | — |
| OBTS[2], parts | — | — | 1.5 |
| moles | — | — | 0.0060 |
| Cured at 160° C., Time, Minutes | 14 | 11 | 17 |
| Tensile, psi | 2700 | 2590 | 2130 |
| 200% modulus, psi | 1410 | 1430 | 1630 |
| Elongation, percent | 370 | 370 | 285 |

[1] N,N-dieicosylthiocarbamyl-N',N'-dicyclohexylsulfenamide
[2] N-oxydiethylenebenzothiazole-2-sulfenamide The data shows that Sample 2, cured using the N,N-(higher alkyl) thiocarbamylsulfenamide, had higher tensile than Sample 3 cured using OBTS. The higher tensile is indicative of better co-vulcanization between the polymer in the blend.

Further comparisons with known art compounds were made. Japanese Patent No. 69 14,577 to Samukawa et al (also found in Chem. Abstracts, Vol. 72, 22461q) discloses the compound N-morpholinothiocarbamyl-N',N'-dicyclohexylsulfenamide as a vulcanization accelerator for an unsaturated polymer. The compound was prepared and compared with a compound of the present invention as a curative for polymer blends. Results are as follows:

|  | 1 | 2 |
|---|---|---|
| EPDM[1] | 70 | 70 |
| SBR1502 | 30 | 30 |
| N285 Black | 85 | 85 |
| Naphthenic oil | 30 | 30 |
| Zinc Oxide | 5 | 5 |
| Stearic Acid | 1 | 1 |
| Sulfur | 2 | 2 |
| N-morpholinothiocarbamyl- | 1.71 | — |

-continued

|  | 1 | 2 |
|---|---|---|
| N',N'-dicyclohexylsulfenamide |  |  |
| N,N-dioctadecylthiocarbamyl-N',N'-dicyclohexylsulfenamide | — | 3.88 |
| Cured at 302° F. |  |  |
| Time, Minutes | 22 | 25 |
| Tensile, psi | 1060 | 1650 |
| Elongation, percent | 330 | 440 |

[1]EPDM of 60% by weight ethylene, 36% by weight propylene, and 4% by weight ethylidene norbornene, and having a Mooney value of about 80 (ML-10 at 212° F.)

The comparison is on an equal mole basis. The data shows that the present compound (Sample 2) co-cures the polymer blend much more effectively than the art compound (Sample 1). The data also demonstrates that the N,N-positions on the thiocarbamylsulfenamide compound are crucial to the successful use of the compounds as co-vulcanization accelerators.

EXAMPLE VII

Expanding upon the showing in the previous example, a comparison was run among (a) a thiocarbamylsulfenamide compound of the invention having N,N-di(higher alkyl) substituents and N',N'-dimethyl substituents, (b) a compound with all four N,N,N',N'-positions having methyl substituents, and (c) a compound outside of the invention having N,N-dimethyl and N',N'-di(higher alkyl) substituents. The EPDM used is the same as in Example VI (as EPDM[1]). The thiocarbamylsulfenamide compounds were prepared in Examples I and IV.

positions, $R_a$ and $R_b$, are methyl and the N',N'-positions, $R_1$ and $R_2$, are methyl).The compound is a poor co-vulcanization accelerator for polymer blends of the type described in the specification. Sample 3 contains a tiocarbamylsulfenamide compound having higher alkyl groups on the sulfur atom nitrogen; ie. the N',N'-positions. As can be seen from the data, physical properties of the polymer blend vulcanizate improved. However, unexpectedly, the vulcanizate properties of Sample 1 are even more improved. Sample 1 contains a compound of the present invention; i.e. a N,N-(higher alkyl) thiocarbamylsulfenamide.

Examples V, VI, and VII establish that thiocarbamylsulfenamide compounds having higher alkyl groups are excellent co-vulcanization accelerators for polymer blends of ethylene-higher α-olefin-polyene polymers and high unsaturated rubbers. The use of the higher alkyl substituted thiocarbamylsulfenamides provide vulcanizable compositions having an improved balance of scorch safety and fast cure when compared to other known higher alkyl substituted accelerators. Further, the higher alkyl substituted thiocarbamylsulfenamides exhibit even better efficiency when the higher alkyl groups are present on the N,N-positions.

EXAMPLE VIII

The SBR rubber employed in Example VI was blended with an EPDM polymer, and the blend cured using various thiocarbamylsulfenamide compounds as accelerators. The EPDM polymer used had a composition of about 60% by weight ethylene, about 36% by weight propylene, and 4% by weight of ethylidene nor-

|  | 1 | 2 | 3 |
|---|---|---|---|
| EPDM | 70 | 70 | 70 |
| SBR1502 | 30 | 30 | 30 |
| N285 Black | 85 | 85 | 85 |
| Naphthenic Oil | 60 | 60 | 60 |
| Zinc Oxide | 5 | 5 | 5 |
| Stearic Acid | 1 | .1 | 1 |
| Sulfur | 2 | 2 | 2 |
| N,N-didecylthiocarbamyl-N',N'-dimethylsulfenamide | 2.08 | — | — |
| N,N-dimethylthiocarbamyl-N',N'-dimethylsulfenamide | — | 0.82 | — |
| N,N-dimethylthiocarbamyl-N',N'-didecylsulfenamide | — | — | 2.08 |
| Cured at 302° F. |  |  |  |
| Time, Minutes | 24 | 15 | 24 |
| 300% Modulus, psi | 1210 | 940 | 1040 |
| Tensile, psi | 1560 | 960 | 1330 |
| Elongation, percent | 400 | 320 | 440 |
| Cured 40 Minutes at 302° F. |  |  |  |
| 300% Modulus | 1390 | — | 1300 |
| Tensile | 1600 | 1110 | 1490 |
| Elongation | 360 | 280 | 350 |

The compound in Sample 2 has all four of its nitrogen positions substituted with low alkyl groups (i.e. the N,N bornene, and a Mooney value (ML-4 at 212° F.) of about 80. The recipes used and data obtained are as follows:

TABLE

|  | 1 | 2 | 3 | 4 |
|---|---|---|---|---|
| EPDM | 70 | 70 | 70 | 70 |
| SBR | 30 | 30 | 30 | 30 |
| N285 Black | 85 | 85 | 85 | 85 |
| Oil | 60 | 60 | 60 | 60 |
| Zinc Oxide | 5 | 5 | 5 | 5 |
| Stearic Acid | 1 | 1 | 1 | 1 |
| Sulfur | 2 | 2 | 2 | 2 |
| $C_1$[1] | 0.65 | — | — | — |
| $C_1, C_6$[2] | — | 1.13 | — | — |
| $C_6, C_6$[3] | — | — | 1.75 | — |
| $C_{18}, C_6$[4] | — | — | — | 3.07 |
| Cured at 320° F. |  |  |  |  |

TABLE-continued

|  | 1 | 2 | 3 | 4 |
|---|---|---|---|---|
| Time, minutes | 22 | 24 | 50 | 41 |
| Tensile, psi | 1170 | 1150 | 1610 | 1920 |
| 300% modulus, psi | 1000 | 980 | 1000 | 1200 |
| Elongation, percent | 390 | 410 | 420 | 490 |
| Hardness, Durometer A | 69 | 70 | 65 | 66 |
| Aged 70 hrs. at 250° F. | | | | |
| Tensile, psi | 850 | 840 | 1080 | 1240 |
| Elongation, percent | 280 | 270 | 240 | 210 |
| Flexometer heat build-up 143 psig, 50° C., 17.5% $\Delta T$, ° C. | blow-out | blow-out | 118 | 89 |

[1] N,N-dimethylthiocarbamyl-N',N'-dimethylsulfenamide
[2] N,N-dimethylthiocarbamyl-N',N'-dicyclohexylsulfenamide
[3] N,N-dihexylthiocarbamyl-N',N'-dicyclohexylsulfenamide
[4] N,N-dioctadecylthiocarbamyl-N',N'-dicyclohexylsulfenamide The accelerators were used at equimolar levels. Cure times were determined using a Viscurometer at 302° F. Time to reach 90% of maximum torque ($t_{90\%}$) was employed.

Sample 1 is cured using a thiocarbamylsulfenamide outside of the scope of the invention; i.e., the $R_a$ and $R_b$ are not alkyl radicals containing at least 6 carbon atoms in each radical. Sample 2 uses a thiocarbamylsulfenamide that is also outside of the scope of this invention; i.e., the $R_a$ and $R_b$ are not alkyl radicals wherein the carbon atoms in each group is at least 6. Note that Sample 2 which contains a compound having cyclohexyl groups in the N',N'-positions exhibits no better results than Sample 1 which has methyl groups in the N',N' positions. Sample 3 is within the scope of the invention. Sample 3 exhibits better tensile, aged tensile, and flex heat build-up than Samples 1 and 2. Sample 4, which has the best properties of the four samples, uses a thiocarbamylsulfenamide within the most preferred range of compounds; i.e., having $R_a$ and $R_b$ alkyl radicals containing at least 8 carbon atoms in each group.

EXAMPLE IX

Natural rubber, RSS No. 1, was admixed with an EPDM polymer in a weight ratio of 70 parts by weight EPDM and 30 parts by weight natural. The EPDM polymer contained about 56% by weight ethylene, about 36% by weight propylene, and about 8% by weight ethylidene norbornene, and had about an 80 Mooney value. The blend was cured using various thiocarbamylsulfenamide compounds at equimolar weight as accelerators. The recipes and data are as follows:

|  | 1 | 2 | 3 |
|---|---|---|---|
| EPDM | 70 | 70 | 70 |
| Natural Rubber | 30 | 30 | 30 |
| N285 Black | 76 | 76 | 76 |
| Oil | 45 | 45 | 45 |
| Zinc Oxide | 5 | 5 | 5 |
| Stearic Acid | 1 | 1 | 1 |
| Sulfur | 2 | 2 | 2 |
| $C_1$ | 0.65 | — | — |
| $C_1, C_6$ | — | 1.13 | — |
| $C_{18}, C_6$ | — | — | 3.07 |
| Cured at 320° F. | | | |
| Time, Minutes | 14 | 16 | 23 |
| Tensile, psi | 1920 | 1770 | 2330 |
| 300% modulus, psi | 1390 | 1220 | 1230 |
| Elongation, percent | 430 | 460 | 530 |
| Hardness, Durometer A | 67 | 66 | 62 |
| Flexometer heat build-up 143 psig, 17.5%, 50° C. $\Delta T$, ° C. | 93 | 109 | 95 |

Samples 1 and 2 use thiocarbamylsulfenamides outside the scope of this invention. Sample 3 is within the scope of the invention. As the data shows, higher tensiles are obtained with the compositions of this invention.

EXAMPLE X

Example IX was repeated using a different recipe. The EPDM polymer used contained 55% by weight of ethylene, 36% by weight of propylene, and 9% by weight of ethylidene norbornene, and had a (ML-10 at 212° F.) Mooney of 50. The thiocarbamylsulfenamides were compared with a known commercial accelerator. The recipes and data are as follows:

|  | 1 | 2 | 3 |
|---|---|---|---|
| EPDM | 70 | 70 | 70 |
| Natural Rubber | 30 | 30 | 30 |
| N550 Black | 50 | 50 | 50 |
| Zinc Oxide | 5 | 5 | 5 |

-continued

|  | 1 | 2 | 3 |
|---|---|---|---|
| Stearic Acid | 2 | 2 | 2 |
| Sulfur | 2 | 2 | 2 |
| OBTS[1] | 1.5 | — | — |
| $C_8, C_6$[2] | — | 2.0 | — |
| $C_{20}, C_6$[3] | — | — | 3.33 |
| Cured at 150° C. |  |  |  |
| Time, Minutes | 13 | 17 | 21 |
| Tensile, psig | 2090 | 2440 | 2620 |
| 300 modulus, psig | 1450 | 1700 | 1600 |
| Elongation, percent | 470 | 420 | 490 |
| Cured at 150° C., |  |  |  |
| Time, Minutes | 23 | 27 | 22 |
| Flexometer heat buildup |  |  |  |
| 55 No. 17.5%, 50° C./ΔT, ° C. | 91 | 66 | 79 |
| Compression set, percent | 69 | 41 | 47 |

[1] N-oxydiethylenebenzothiazole-2-sulfenamide
[2] N,N-di(2-ethylhexyl)thiocarbamyl-N',N'-dicyclohexylsulfenamide
[3] N,N-dieicosylthiocarbamyl-N,N'-dicyclohexylsulfenamide The compositions of this invention, samples 2 and 3, had higher tensile, lower flex heat build-up, and lower compression set (ASTM D395, method B, 22 hours at 212° F.) than sample 1 cured using a known accelerator.

EXAMPLE XI

The EPDM polymer used in Example VI was mixed with NBR rubber and cured. The NBR rubber contained 68% by weight of butadiene and 32% by weight acrylonitrile, and had a Mooney value (ML-4 at 212° F.) of about 55. The following recipes were used:

|  | 1 | 2 | 3 | 4 |
|---|---|---|---|---|
| EPDM | 100 | 50 | 50 | — |
| NBR | — | 50 | 50 | 100 |
| N330 Black | 50 | 50 | 50 | 50 |
| Zinc Oxide | 5 | 5 | 5 | 5 |
| Stearic Acid | 3 | 3 | 3 | 3 |
| Sulfur | 2 | 2 | 2 | 2 |
| $C_{52}$[1] | 4 | 4 | — | 4 |
| MBTS[2] | — | — | 1.5 | — |
| Cured at 160° C., |  |  |  |  |
| Time, Minutes | 25 | 24 | 20 | 24 |
| Tensile, psi | 2510 | 2480 | 1945 | 4010 |
| 200% Modulus, psi | 1400 | 1890 | 1360 | 1820 |
| Elongation, percent | 360 | 265 | 285 | 375 |
| Volume swell, percent |  |  |  |  |
| 70 hours at 212° F. |  |  |  |  |
| ASTM No. 3 Oil | 247 | 114 | 128 | 20 |

[1] N,N-dieicosylthiocarbamyl-N',N'-dicyclohexylsulfenamide
[2] 2,2'-benzothiazyl disulfide The accelerators were compared on about an equimolar basis. Sample 2, using a thiocarbamylsulfenamide of this invention, had higher tensile strength and lower volume swell than Sample 3 which was cured using a well known commercial accelerator.

We claim:

1. A vulcanizable composition comprising (1) from about 1% to about 99% by weight of the polymer blend of an ethylene-higher α-olefin-polyene polymer, (2) from about 1% to about 99% by weight of the polymer blend of a highly unsaturated rubber, having an olefinic content from about 20% to about 45% by weight based upon the total weight of the polymer (3) as the vulcanizing agent, sulfur or a sulfur donor used at a level of from about 0.5 to 10 parts by weight based upon 100 parts by weight of the polymer blend, and (4) as the vulcanization accelerator used at a level from about 0.1 to about 10 parts by weight based upon 100 parts by weight of the polymer blend, a thiocarbamylsulfenamide of the formula

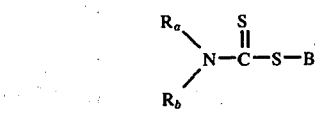

where B is selected from the group consisting of

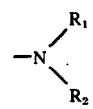 , 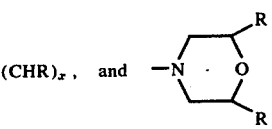

wherein $R_1$ and $R_2$ are selected from the group consisting of alkyl radicals containing 1 to about 4 carbon atoms and cycloalkyl radicals containing 4 to 7 carbon atoms in the ring; R is hydrogen or an alkyl radical containing 1 to 2 carbon atoms; x is 4 to 7; and $R_a$ and $R_b$ are alkyl radicals containing 6 to about 30 carbon atoms.

2. A composition of claim 1 wherein (1) is a polymer comprising about 10 percent to about 90 percent by weight of ehtylene, about 10 percent to about 80 percent by weight of a higher α-olefin containing 3 to about 14 carbon atoms, and from about 0.5 percent to about 20 percent by weight of a nonconjugated diene containing 5 to about 25 carbon atoms, all weights based upon the weight of the polymer.

3. A composition of claim 2 wherein (1) the nonconjugated diene content is from about 1 percent to about 10 percent by weight of the polymer, the ethylene content is from about 20 percent to about 80 percent by weight and the higher α-olefin content is from about 19 percent to about 70 percent by weight.

4. A composition of claim 2 wherein (2) is selected from the group consisting of natural rubber, polyisoprene rubber, polybutadiene rubber, polypentenamer rubber, poly(butadiene-styrene) rubber, poly(isoprene-styrene) rubber, polychloroprene rubber, poly(butadiene-acrylonitrile) rubber, and poly(isoprene-acrylonitrile) rubber.

5. A composition of claim 4 where in (4), $R_a$ and $R_b$ are alky radicals containing 8 to about 24 carbon atoms.

6. A composition of claim 5 where in (1), the higher α-olefin is selected from the group consisting of propylene and 1-butene, and the nonconjugated diene is an alkenyl norbornene.

7. A composition of claim 6 where in (4), B is the group -$NR_1R_2$ where $R_1$ and $R_2$ are alkyl radicals containing 1 to about 4 carbon atoms or are cycloalkyl radicals containing 4 to 7 carbon atoms in the ring.

8. A composition of claim 7 where in (1), the higher α-olefin is propylene and the nonconjugated diene is ethylidene norbornene.

9. A composition of claim 8 where in (4), $R_a$ and $R_b$ are alkyl radicals containing 8 to about 24 carbon atoms and $R_a$ and $R_b$ are alike, and B is the group -$NR_1'R_2'$ where $R_1'$ and $R_2'$ are cycloalkyl radicals containing 5 to 7 carbon atoms in the ring.

10. A composition of claim 7 wherein (4) is selected from the group consisting of N,N-dihexylthiocarbamyl-N',N'-dicyclohexylsulfenamide, N,N-di(2-ethylhexyl)-thiocarbamyl-N',N'-dicyclohexylsulfenamide, N,N-dioctadecylthiocarbamyl-N',N'-dicyclohexylsulfenamide, N,N-dieicosylthiocarbamyl-N',N'-dicyclohexylsulfenamide, and N,N-didecylthiocarbamyl-N',N'-dimethylsulfenamide.

11. A composition of claim 9 wherein (4) is N,N-dioctadecylthiocarbamyl-N',N'-dicyclohexylsulfenamide.

12. A composition of claim 11 wherein (2) is poly(butadiene-styrene) rubber.

13. A composition of claim 11 wherein (2) is poly(butadiene-acrylonitrile) rubber.

14. A composition of claim 11 wherein (2) is natural rubber.

* * * * *

UNITED STATES PATENT OFFICE
CERTIFICATE OF CORRECTION

PATENT NO. : 4,008,190
DATED : February 15, 1977
INVENTOR(S) : Ray D. Taylor & Robert A. Krueger It is certified that error appears in the above-identified patent and that said Letters Patent are hereby corrected as shown below:

Column 18, in Claim 1, at line 30, the formula "-N (CHR)$_x$" should read

--N◯(CHR)$_x$--.

Signed and Sealed this

Twenty-fourth Day of April 1979

[SEAL]

Attest:

RUTH C. MASON
Attesting Officer

DONALD W. BANNER
Commissioner of Patents and Trademarks